(12) United States Patent
Altomare

(10) Patent No.: US 10,399,045 B2
(45) Date of Patent: Sep. 3, 2019

(54) ROBOTIC LITTER PROCESSING SYSTEM

(71) Applicant: Mike Altomare, Merced, CA (US)

(72) Inventor: Mike Altomare, Merced, CA (US)

( * ) Notice: Subject to any disclaimer, the term of this patent is extended or adjusted under 35 U.S.C. 154(b) by 173 days.

(21) Appl. No.: 15/481,428

(22) Filed: Apr. 6, 2017

(65) Prior Publication Data

US 2017/0293305 A1 Oct. 12, 2017

Related U.S. Application Data

(60) Provisional application No. 62/320,495, filed on Apr. 9, 2016.

(51) Int. Cl.

| | |
|---|---|
| *B01F 3/12* | (2006.01) |
| *A01K 1/015* | (2006.01) |
| *A01K 31/04* | (2006.01) |
| *B01F 7/08* | (2006.01) |
| *B01F 7/00* | (2006.01) |
| *B01F 13/00* | (2006.01) |
| *G05D 1/02* | (2006.01) |

(52) U.S. Cl.
CPC ............ *B01F 3/1221* (2013.01); *A01K 1/015* (2013.01); *A01K 31/04* (2013.01); *B01F 7/0025* (2013.01); *B01F 7/00416* (2013.01); *B01F 7/08* (2013.01); *B01F 13/0037* (2013.01); *G05D 1/0231* (2013.01); *G05D 2201/0201* (2013.01)

(58) Field of Classification Search
CPC ............... G05D 1/0219; G05D 1/0287; G05D 2201/0201; B01F 3/188; B01F 7/08; B01F 7/00416; B01D 3/1221; B01D 7/0025; A01K 1/015; A01K 31/04

See application file for complete search history.

(56) References Cited

U.S. PATENT DOCUMENTS

| | | | |
|---|---|---|---|
| 4,187,916 | A | 2/1980 | Harden et al. |
| 5,974,348 | A | 10/1999 | Rocks |
| 7,341,024 | B2 | 3/2008 | Wood |
| 9,241,442 | B2 | 1/2016 | Diazdelcastillo |
| 9,288,938 | B2 | 3/2016 | Cavender-Bares et al. |
| 9,290,905 | B1 | 3/2016 | Diaz et al. |
| 9,433,186 | B2 * | 9/2016 | Romano ............. A01K 1/0114 |
| 9,611,605 | B1 * | 4/2017 | Pennock .................. E01H 6/00 |
| 9,796,091 | B1 * | 10/2017 | Soo ........................ B25J 9/1689 |
| 2012/0168545 | A1 | 7/2012 | Bender | |

FOREIGN PATENT DOCUMENTS

| | | | |
|---|---|---|---|
| CN | 204119975 U | 6/2014 | |
| EP | 2476309 A1 | 7/2012 | |
| GB | 2534265 A * | 7/2016 | ............... A01K 1/01 |

* cited by examiner

*Primary Examiner* — Mary Cheung

(57) ABSTRACT

A litter processing system is provided implementing one or more robotic vehicles to process livestock litter, detect conditions of the litter with a plurality of sensors, and treat the litter based upon data collected by the sensors. The vehicles may include processors and software that control vehicle tasks. The vehicle's onboard software may be controlled by a server having an instance of the software thereby controlling operation of the vehicles and collecting sensor data from the vehicles via a wireless network.

17 Claims, 6 Drawing Sheets

ROBOTIC LITTER PROCESSING SYSTEM

CROSS-REFERENCE TO RELATED DOCUMENTS

The present invention claims priority to a U.S. provisional patent application titled Robotic Litter Processing Vehicle Ser. No. 62/320,495 filed on Apr. 9, 2016, disclosure of which is included herein at least by reference.

BACKGROUND OF THE INVENTION

1. Field of the Invention

The present invention is in the field of agricultural machines including automated robots and vehicles and pertains particularly to methods and apparatus for processing livestock litter to neutralize undesirable conditions in an automated fashion.

2. Discussion of the State of the Art

In the art of agriculture where it pertains to livestock, such as poultry for example, efforts are underway to establish better guidelines and methods for processing litter and bedding such as on a farm supporting commercial livestock operations. Bedding and or litter conditions that may be undesirable for the animals kept in relatively tight quarters may arise and may, in some cases, cause harm to animals contributing to poorer health and production of such animals.

Typical machines used for processing poultry are employed by workers and are typically pushed along or pulled through the litter in order to neutralize the specific conditions found. The conditions themselves are difficult to monitor and compensate for as some of these conditions are not readily detectable by the average worker. It is desired that many litter processing tasks be performed without requirement of human labor and constant site monitoring in order to quickly evaluate conditions and whether treatments were effective.

Therefore, what is clearly needed is self-guided agro tilling machines that may sense, evaluate and treat specific undesired conditions that may occur in the litter and bedding of animals such as poultry.

BRIEF SUMMARY OF THE INVENTION

The present invention provides a livestock litter processing system that operates to process the litter in place, for example on the floor of livestock enclosures of varying sizes. The system includes at least one robotic vehicle including an elongate housing with a length, width, front, rear, top, center and two opposing sides creating an inner space for mounting components. An on-board processor having software executing from a non-transitory medium may be installed.

The vehicle may include a plurality of sensors communicating raw data at least to the processor, at least two rotable parallel tracks operated by a motor and axle assembly and controlled by the software providing mobility for the vehicle over the litter, a litter accumulating auger shaft mounted laterally in the front housing making contact with the litter and may include auger flutes in a spiral formation positioned on the auger shaft forcing the litter to the center of the housing.

In this embodiment a computerized server storing and executing an instance of the software may be included in the system enabling wireless communication with the processor. The sensors may include at least optical sensors gathering first data including at least stationary and mobile obstacles, communicates the first data to the processor wherein the software assists in navigation of the vehicle to avoid making contact with the obstacles.

In one embodiment the litter processing system includes a spreading auger shaft installed laterally towards the rear of the housing having auger flutes in a spiral formation angled to spread litter away from the vehicle towards the two opposing sides. In another embodiment the litter processing system includes a mixing auger shaft is installed longitudinally between the litter accumulating and spreader auger shafts including means for mounting litter blending protrusions and apertures including at least tines for mixing the litter.

Embodiments may include that the tracks are located between the center and front of the housing and a tilling plate is positioned between the tracks and the litter accumulating auger shaft, the tilling plate including an angled sharp edge extending towards the tracks having teeth and slots allowing litter to pass between the teeth, and a leveling plate may be positioned at the rear of the housing, supporting the vehicle.

In some embodiments one or more of the sensors are moisture, PH, temperature and ammonia sensors located near the front of the housing making contact with the litter sending second data to one or both of the processor and server. The housing may also include means for storing dry and liquid litter treatment agents above the mixing auger shaft, means for dispensing the dry and liquid agents, the software determining types of treatment and type of agents dispensed based upon the second data.

In some embodiments the agents may include any one of liquids and solids comprising at least specific enzymes, drying agents, moisturizing agents, ammonia neutralizing agents, and PH adjustment agents. Additionally, in this embodiment, the additional ones of the sensors are also located at the rear of the housing after the spreading auger shaft, making contact with the litter and sending third data to the processor. This embodiment may include additional vehicles employed in the system to perform specific additional litter processing jobs controlled by the software via direct communication between the vehicles or from the server, based at least upon the third data.

The present invention also may provide a method for processing litter, comprising the steps of a) providing a robotic vehicle having an elongate housing with a length, width, front, rear, top, center and two opposing sides creating an inner space for mounting components; b) operating the vehicle via a local processor storing and executing an instance of operating software and cooperating with an instance of the software stored on and executing from a computerized server wirelessly connected to the processor;

c) mobilizing the robotic vehicle, by the software, to traverse livestock litter by operating at least two rotatable parallel tracks mounted in the housing via a motor and axle assembly providing mobility for the vehicle over the litter; d) gathering raw data by a plurality of sensors mounted on the vehicle and communicating the raw data to the processor; e) gathering first raw data by the sensors including at least an optical sensor detecting at least stationary and mobile obstacles, communicating the first data to the processor and the software navigates the vehicle to avoid making contact with the obstacles, and f) accumulating litter by a first auger shaft mounted laterally in the front of the housing making contact with the litter, the first auger shaft having auger flutes in a spiral formation positioned to force the litter to the center of the housing.

Another embodiment may add a step for spreading litter away from the vehicle towards the two opposing sides by a second auger shaft having auger flutes in a spiral formation angled to engage the litter forcing it towards the two sides, the second auger shaft installed laterally towards the rear of the vehicle. A third auger shaft may be included in another step, wherein the third auger shaft is installed longitudinally between the first and second auger shaft including means for mounting litter blending protrusions and apertures including at least tines for mixing the litter.

One embodiment includes a step for locating the tracks between the center and front of the housing and the litter is processed by a tilling plate positioned between the tracks and the first auger shaft, the tilling plate including an angled sharp edge extending towards the tracks having teeth and slots allowing litter to pass between the teeth, and a leveling plate is positioned at the rear of the housing, supporting the vehicle.

This method may additionally include that one or more of the sensors are moisture, PH, temperature and ammonia sensors located near the front of the housing making contact with the litter sending second data to one or both of the processor and server. A step may also be included for providing a means for storing dry and liquid litter treatment agents in the housing above the mixing auger shaft, and means for dispensing the dry and liquid agents, the software determining types of treatment and type of agents dispensed based upon the second data.

In this embodiment the agents may include any one of liquids and solids comprising at least specific enzymes, drying agents, moisturizing agents, ammonia neutralizing agents, pesticides, insecticides and PH adjustment agents. After treatment with agents and mixing steps, an additional step is added for implementing additional ones of the sensors located at the rear of the housing after the second auger shaft, making contact with the litter and sending third data to the processor.

DETAILED DESCRIPTION OF THE INVENTION

In various embodiments described in enabling detail herein, the inventor provides a unique system for processing animal litter in an automated fashion. The present invention is described using the following examples, which may describe more than one relevant embodiment falling within the scope of the invention.

Figure 1:
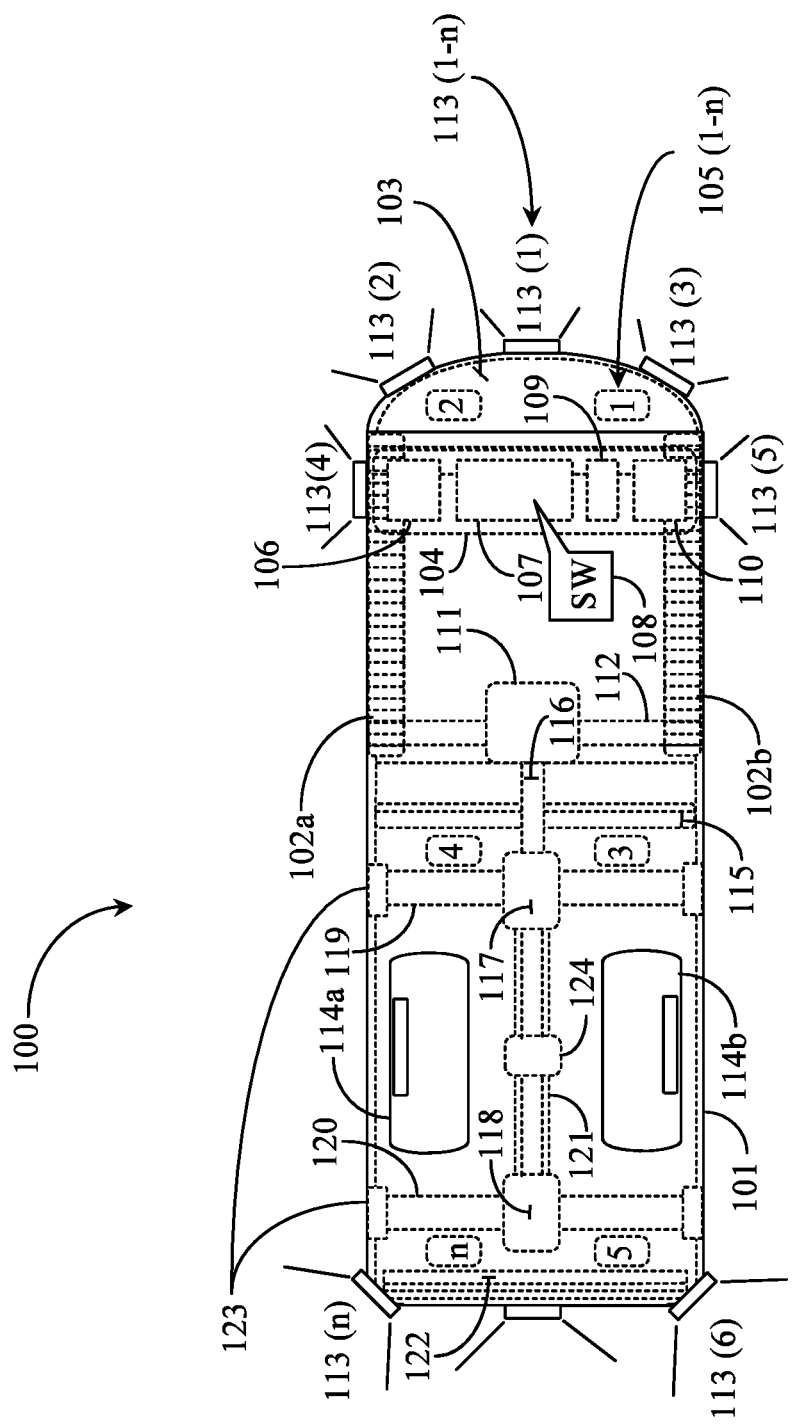
FIG. 1 is an overhead view of a robotic litter processing vehicle according to an embodiment of the present invention.

FIG. 1 is an overhead view of a robotic litter processing vehicle 100 according to an embodiment of the present invention. Litter processing vehicle 100 may be referred to hereinafter in this specification as vehicle 100. Some components depicted in this embodiment are illustrated using hidden (broken) lines. Vehicle 100 is adapted as a self-guided robotic vehicle that is further adapted with specific implements for processing animal litter such as poultry litter (Chicken, Turkey, Duck) although the invention may be practiced in any livestock environment including beef cattle, swine, horses and sheep.

Poultry litter should not be construed as a limitation as the present invention may also be adapted for processing goat bedding or litter and that of other farm animals without departing from the spirit and scope of the present invention. Vehicle 100 may be supplied with on-board software instruction executable from a non-transitory medium on the vehicle to enable machine performance of multiple tasks including detection of specific conditions or states of the poultry litter before treatment thereof.

Vehicle 100 includes a housing or body 101. Body 101 has a wall thickness and may be in the form of an elongate semi-annular shell having a bullet profile including a front nose section 103 that tapers down conically. Body 101 may be a molded piece or a semicircular piece of steel tubing or formed sheet metal. In one embodiment, weighted materials may be added to vehicle 100 to make it heavier in the field and more effective in the field. Machine 100, in this embodiment, is adapted to be used within a poultry house or area having a floor or ground covered with poultry litter requiring maintenance in order to optimize the longevity and viability of the litter. Machine 100 is longer than it is wide and may be manufactured in varying sizes (lengths and widths) without departing from the spirit and scope of the present invention.

Body 101 is closed on the top, front, and rear portions thereof but is open underneath to enable contact between specific implements of the vehicle and the litter beneath the machine. Machine 101 traverses along a pair of tracks 102a and 102b. In one embodiment wheels might be used in place of or in combination with tracks without departing from the spirit and scope of the present invention. Tracks are preferred in this embodiment due to superior traction. Tracks 102a and 102b may be manufactured or molded from a durable rubber or durable polymer material or a composite thereof. In one embodiment tracks 102a and 102b may be manufactured of steel or other durable metal.

Vehicle 100 may be powered by a battery 106 proximal to an electronics compartment 104. Compartment 104 is adapted to house the computing and electronic components of the system. Battery 106 may be rechargeable and may power all of the features and components of vehicle 100. In one embodiment there may be more than one battery powering different features without departing from the spirit and scope of the invention. Compartment 104 may be accessible through hinged cover (not illustrated) proximal to the top nose section 103 of vehicle 100. Compartment 104 might instead be a shelf or rack for mounting the electronic components thereon, which include battery 106. Track sections 102a and 102b may be held relatively parallel to one another by a pair of track axles 112.

Track system 102a, 102b, may be controlled by a motor 111. Motor 111 may have a power input connection (not illustrated) from battery 106. Motor 111 may be an electric motor having drive gears including at least one forward gear and at least one reverse gear. In one embodiment tracks 102a and 102b only move in tandem with one another either in forward gear or in a reverse gear. In one embodiment, motor 111 may further include a turning mechanism enabling vehicle 100 to turn left or right and to change general direction of travel based on information detected by or accessed by the vehicle.

Vehicle 100 is, in one embodiment, self-guided and may include an obstacle presence detection system with proximity sensors or optics devices 113 (1–n). In one embodiment, proximity sensors are provided to detect obstacles that may be in the path of the vehicle such as a bird, an animal, a feed trough, a wall, or any other obstacle to movement of the vehicle. In one embodiment, proximity sensors 113 (1–n) may be cameras. In another embodiment, sensors 113 (1–n) may be electronic bumpers that report contact with an obstacle to the vehicles robotic navigation system "brain" so that corrective maneuvers may be undertaken to avoid the obstacle that the vehicle has come into contact with. In this example, there are seven proximity sensors, three in front, two side implements and two at the rear. There may be fewer or more proximity sensors installed on vehicle 100 or any combination of sensor types employed in the vehicle 100 without departing from the spirit and scope of the present invention. In still another embodiment sensors 113 (1–n) may be replaced with a wraparound proximity bumper that is electronically adapted to report any contact with obstacles.

Vehicle 100 may include a main processor 107, a memory 109, and a wireless-enabled communications module 110. Battery 106 may provide power to boot up or start processor 107 and to execute a software or firmware 108 to, among other tasks, initiate navigation. For example, vehicle 100 may navigate through a course of obstacles by detecting them with the aid of one or more proximity sensors 113 (1–n) and then correcting navigation to move past or otherwise get around the obstacles. SW 108 may enable vehicle 100 to communicate with another computing device or server to obtain information such as global positioning satellite (GPS) data and positional orientation of a poultry house or area relative to the four directions North, South, East, and West.

Vehicle 100 aided by SW 108 may orientate itself through communication and GPS reporting once it is placed within or otherwise enters a work area. Vehicle 100 may configure an efficient navigation strategy for covering the litter area present based on data evaluated such as GPS data, sensor data, third party communicated data, mapping data and any other data that may be previously programmed into memory 109 of vehicle 100. Processor 107 aided by SW 108 may control motor 111 and may switch motor 111 on and off, execute turns (turning mechanism), move in reverse and forward, change traversal speeds, and so on. In one embodiment, motor 111 drives tracks 102a and 102b and it may also drive other litter processing elements by virtue of a drive shaft 116. Motor 111 may include a housing and one or more drive gear assemblies having a connection to a geared interface on at least one of track axles 112 for driving tracks 102a and 102b. There are two track axels 112 in this example but only the rear one is clearly visible. The front axle may be situated beneath computing compartment 104. There may be more than two track axles without departing from the spirit and scope of the invention.

Motor 111 has connection to a drive shaft 116. Drive shaft 116 extends longitudinally from motor 111 through a front gear hub 117. Front gear hub 117 contains a gear mechanism for driving a lateral front auger shaft 119. Auger shaft 119 may be seated laterally across the width direction of vehicle 100 using bearing seats 123 enabling full rotation of auger shaft 119 about its axis. A gear interface may be provided about the center portion of shaft 119 to engage with the gear mechanism within gear hub 117. Drive shaft 116 further extends longitudinally toward the rear of the vehicle and may pass through a middle gear hub 124.

Middle gear hub 124 may contain a gear mechanism for driving a longitudinal blending shaft 121. Blending shaft 121 may be substantially orthogonal to the front and rear auger shafts that are longitudinally oriented within vehicle 100. Drive shaft 116 may further extend through or into a rear gear hub 118. Gear hub 118 may contain a gear mechanism to connect with and drive a rear auger shaft 120. Front and rear auger shafts 119 and 120 may include directional auger flutes (flutes not illustrated here) that may be used to direct or move broken or pulverized poultry litter either toward the center of the vehicle, via the front auger, and away from the center of the vehicle and toward the outside edges of the vehicle via the rear auger. Hence the front auger is referred to as a litter accumulating auger because it may gather litter toward the center and the rear auger is referred to as a litter spreading auger as it may spread litter out from the center of vehicle 100. The blending shaft 121 may include tines or other uniquely designed protrusions useful for mixing or blending the litter it passes over.

Shafts 119, 120, and 121 may be manufactured of steel and include gear tooth interfaces (not illustrated) proximal to the center portion of each shaft to interface with respective gear mechanisms in the gear hubs. In one embodiment, shafts 119, 120, and 121 all turn in a same clockwise direction and at the same speed that may be proportional to a speed of the vehicle when the vehicle is traversing the litter. Vehicle 100 may have a single forward speed setting or more than one forward speed setting. Tracks 102a and 102b may turn independently of one another relative to direction of rotation for turning. Vehicle 100 may also traverse in reverse direction while the shafts 119, 120, and 121 are running and rotating in a clockwise direction. However, that is not a requirement for practice of the present invention as they may be mechanically arranged to rotate in opposing directions relative to one another.

Vehicle 100 includes a stationary tilling plate 115. Tilling plate 115 may be manufactured of hardened steel. Tilling plate 115 extends laterally across the minor width of body 101 and may be mounted to the side walls of the vehicle. The "working" end of tilling plate 115 interfaces with the poultry litter while vehicle 100 is in forward motion to break up the litter, as it may be clumped or caked, into smaller crumbles that can be gathered, aerated and directed by the auger flutes of front auger shaft 119. Vehicle 100 may include a back leveling plate 122. Leveling plate 122 may be adapted to level off the poultry litter at the rear of the vehicle after the litter is treated by the vehicle litter processing components. Leveling plate 122 like tilling plate 115 extends laterally from side wall to side wall and is substantially orthogonal to blending shaft 121. It is noted herein that in this example there are no tracks or wheels at the rear of vehicle 100 so leveling plate 122 is set at an appropriate height to "drag" over the litter for the purposes of leveling it out.

In one embodiment, vehicle 100 may include a plurality of sensors 105 (1–n) for taking certain types of measurements associated with poultry litter processing. In this example there are six sensor or sensing devices 105 (1–n). Sensor 105 (1) may be an ammonia sensor for detecting the level of ammonia emanating from the poultry litter at the front of vehicle 100 as it rolls over the litter. Sensor 105 (2) may detect immediate temperature, for example. Just behind tilling plate 115, are sensors 105 (3) and 105 (4). Sensor 105 (3) may be a moisture or humidity sensor that may detect the amount of moisture in the poultry litter. It is noted that different areas of litter may contain different levels of moisture. Sensor 105 (4) may be a PH sensor for detecting the level of acidity in an area of poultry litter.

It is noted that these measurements may be taken before broken up litter is treated by vehicle 100 and the measurement data generated may be used by SW 108 executing from processor 107 to prescribe and initiate a treatment to the litter, for example, addition of a drying agent and or an acidic, or alkaline supplement to adjust PH level for an area. It is noted herein that sensors 105 (3) and (4) may be preprocess sensors taking measurements of litter condition before blending and supplement addition wherein such measurements taken are functional to determination of types and amounts of supplements to be added to the litter or not. Hence sensors 105 (5) may be a "post" moisture sensor, and sensor 105 (n) may be a post PH sensor as these sensors may be located towards the rear of the vehicle 100.

On board sensors collect the data required to execute litter corrections including at least further processing, aerating, treating with agents and mixing. Litter corrections and reprocessing is determined by either, or both, of software 108 and a network connected server described later in this specification in regards to FIG. 4. Additional data generated to determine litter processing by the software includes at least pathogen and pest testing and may require that physical samples to be taken and analyzed at a lab, or in some instances on-board the vehicle 100. Collection will take place in the mixing area as the bedding has been broken up. The software 108 may note location, date and time of collection and assign a sample identification to the sample, associating the data with the physical sample. Then, when the results are entered from the sample, at the server, for example, the ID information is associated with the sample results, the area to be treated identified and amounts of agents and types of treatments may be determined by the software 408 and instructions sent to onboard processors and software to complete required litter processing tasks based on the results.

The measurements taken at the rear of vehicle 100 may be considered feedback measurements or measurements retaken after a first round of processing of litter. Vehicle 100 may re-traverse a specific area if deemed necessary through analysis of post sensor data by SW 108. Though not illustrated here, sensors 105 (1–n) may be wired via data line to processor 107, or they may communicate to processor 107 through communications module 110. Sensors may be self-contained (batteries) and may be removed and replaced if necessary or powered from the vehicles battery.

Vehicle 100 may include one or more compartments which may be accessible through hinged doors 114a and 114b to a user to place poultry litter supplements or additives therein for distribution into the poultry litter. In one embodiment, the bottom of the compartments may include a mechanism for electronically opening one or more pathways from the inside of the compartments to the area of litter directly beneath them. In one embodiment a shaking mechanism is provided to shake dry material out of compartment wall openings or through aforementioned pathways. In one embodiment, a compartment may be equipped with a spray mechanism for distributing liquid from the compartment into the litter directly beneath. Materials distributed from the compartments may include specific enzymes, drying agents, moisturizing agents, ammonia neutralizing agents, PH adjustment materials (Alkaloid or Acid) or whatever materials may be deemed an appropriate additive or supplement.

Figure 2:
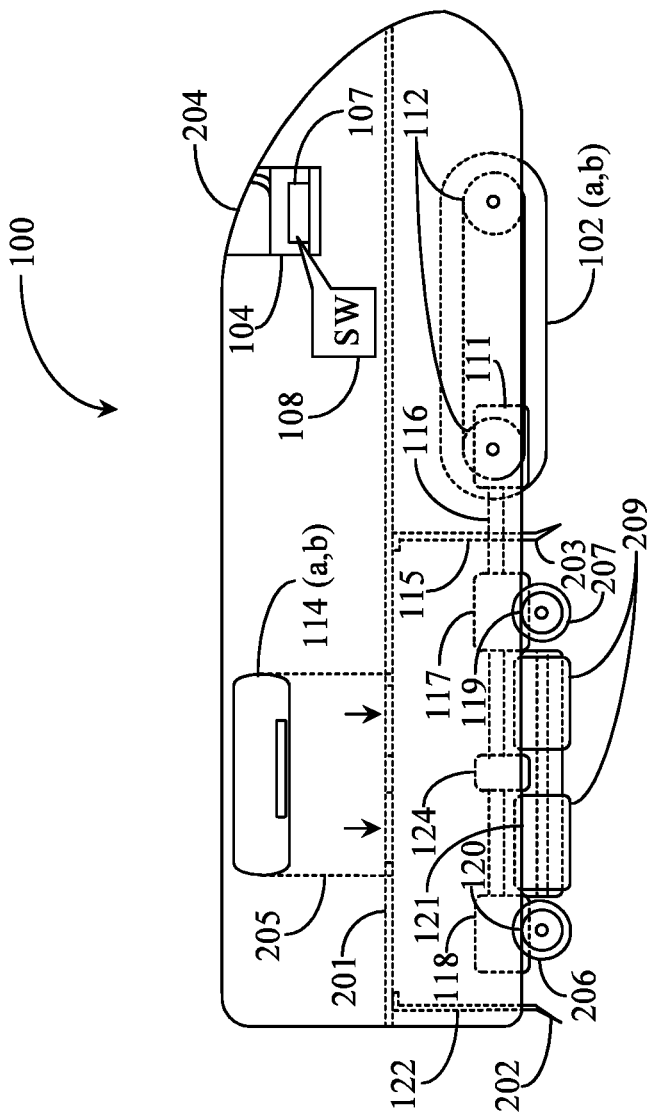
FIG. 2 is a side elevation view of the robotic liter processing vehicle of FIG. 1.

FIG. 2 is a side elevation view of the robotic litter processing vehicle 100 of FIG. 1. Some components described in FIG. 1 may not be depicted in this view to aid clarity in description of other components, but may be assumed present in this embodiment. Component rack or shelf 104 is depicted with processor 107 hosting SW 108. In one embodiment, a mounting deck or wall 201 may be provided laterally within the vehicle body (101) and attached to the inner walls of the body to provide a mounting plate to attach or mount implements to. Mounting deck 201 may be a steel plate or some other durable metallic component able to withstand shock and rigid enough to support the weight of implements attached thereto. Likewise, cross rails or bars may be used strategically in place of a plate to mount components without departing from the spirit and scope of the present invention.

In this example, vehicle 100 traverses with the aid of tracks 102a and 102b fastened about track axles 112. The overall track length or distance from the front of vehicle 100 toward the rear of the unit may vary considerably without departing from the spirit and scope of the present invention. In this example, the tracks support the front of the vehicle on the ground while the rear of the unit is supported by leveling plate 122. In this view tilling plate 115 is viewed from the side. Tilling plate 115 includes an angled edge 203 that culminates or tapers into a sharp edge facing toward the front of vehicle 100. Tilling plate 115 may also contain multiple slots or relief areas, the slots may be positioned in between the teeth of the plate and open past the bottom edge of the plate giving broken litter places to pass through the till plate. In one embodiment, tilling plate 115 is vertically adjustable relative to track 102a and track 102b such that part of the plate penetrates into the litter floor past the bottom track that is simply resting atop the litter. Likewise, leveling plate 122 may be automatically or manually adjustable for setting vertical depth.

In one embodiment, auger shafts 119 and 120 may include auger fluted sections 206 and 207 that may be "keyed" onto and secured to the host shaft using a key groove provided along the length of the shaft and a key protrusion adapted to secure the auger cylinders over the auger shaft locking it onto the shaft. In this way a user such as one maintenance the unit may remove shafts 119 and or 120 for replacement of auger fluted sections having different style or dimensions of flute design. In one embodiment each shaft 119 and 120 may support two opposing auger units or tools wherein the direction of the flutes is opposite at either end of the shaft. Blending shaft 121 may include blending tools 209 that may include tines or protrusions, disks, or other blending apertures. In one embodiment these "blending tools" take a form similar to the previously described auger tools such that shaft 121 may host one tool at either end of the shaft wherein the tools may be "keyed" onto the shaft.

In one embodiment, mounting deck 201 is adjustable in vertical height relative to tracks 102a and 102b such that the difference allows the implements to be lowered into the litter up to a few to several inches deep for directing loose litter directionally for processing. In a variation of this embodiment, mounting deck may be angularly adjustable such that the rear end presents lower than the front end, etc. In one embodiment, adjustment may be manual or it may be electronically controlled using hydraulic or servo-assisted adjustment mechanisms (not illustrated).

In general tilling and blending operations, tiller plate 115 lifts and breaks the surface of the poultry litter as vehicle 100 passes over. Augers 207 rotating clockwise with shaft 119 function to transport the broken up litter toward the center of the vehicle as it is moving due to opposing directional flutes. The material in the center may then be blended or mixed by blending elements or tools 209 rotating with shaft 121. During blending, agents may be automatically distributed to the litter from compartments 205 to compensate for undesired states that may have been detected by sensors. The agents may be dropped onto or otherwise applied to the litter in the general direction of the arrows.

Mounting plate 201 may include openings through which the agents may be dispersed. In one embodiment a vibrational mechanism may be attached to the compartments and may function to shake, for example, a dry agent from the compartment through the opening. As the vehicle moves and blending tools rotate, the agents are mixed into the litter primarily in the center area of the footprint under the vehicle. Shaft 120 with auger tools 206 may be configured opposite relative to direction of litter than shaft 119 with auger tools 207. In this way the mixed poultry litter is spread back out to cover the width of the vehicle footprint.

At the rear of vehicle 100 leveling plate 122 functions to level the surface of the litter as the vehicle passes. Information taken from sensors and processed by SW 108 executing from processor 107 may be used to prescribe dispersal increments of particular agents, and or influence speed of rotation of implements, or how many passes might be made over a same area in the poultry house. Computing components such as processor 107 and other associated components such as the battery and the like may be accessed through a compartment door 204 for maintenance.

In one embodiment, vehicle 100 may be adapted to dock at a mobile charging station for the purpose of charging the system battery for optimum use. A charging station may be a magnetic charging station, or a metal lead contact-to-contact charging station or a plug-in charging station without departing from the spirit and scope of the present invention. Vehicle 100 may be enabled to automatically detect low battery condition and connect to the charging station autonomously. In one embodiment vehicle 100 may be operated by a remote control unit by an operator standing in the vicinity of the unit. This may be accomplished by overriding the self-guided navigation system of the unit for remote control function. This feature may be useful for areas that may need reworking. In one embodiment vehicle 100 may automatically shut down under certain conditions such as when finished performing tasks in an area, when a timer has expired, when a mechanical problem is detected, when battery is low and charging may be required, when supplemental agents are depleted, and so on.

In this example, the rotatable implements used for processing litter are presented generally at the same plane having exposure that is relatively constant across the tool relative to depth of the implements in the litter while working the litter. However, this should not be construed as a limitation of the present invention as shafts may be presented at specific angles relative to the plane of the litter to achieve more depth. Also in one embodiment, vehicle 100 may sample litter for the presence of certain bacteria by dragging an absorbent or sticky material such as swab material over the litter and later examining the material for the presence of certain insects, arachnids or bacterium that are undesirable and that might be treated in a next pass of the litter with a pro-biotic agent, insecticide or an enzyme to control specific bacterium or the other organisms in the litter.

Figure 3:
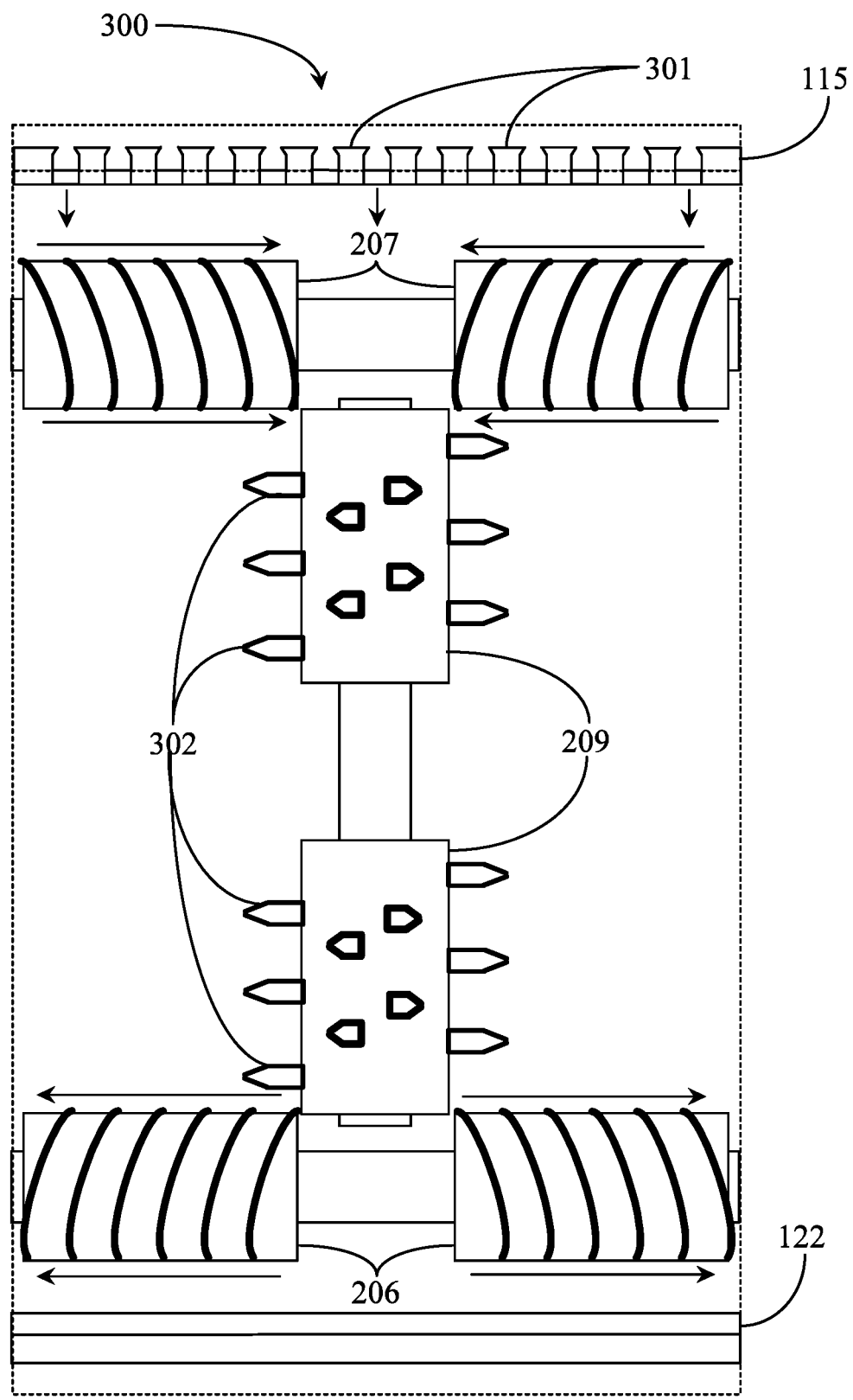
FIG. 3 is and underside view of tilling components of the robotic liter processing vehicle of FIG. 1 according to an embodiment of the present invention.

FIG. 3 is an underside view of tilling components of robotic litter processing vehicle 100 of FIGS. 1 and 2 according to an embodiment of the present invention. The rotable litter working implements collectively assigned element number 300 are depicted within a broken boundary representing a litter "working" area present underneath the vehicle in operation. Till plate 115 depicts, in this embodiment, separate tines 301 formed into plate 115 as a result of machining out or otherwise removing material in a "stock" plate. Till plate 115 may be fabricated of a steel plate or sheet metal resilient enough to till through the litter without flexing, bending, or otherwise deforming. A forward angle enables tines 301 to dig into and lift the litter and to break it up into small nodules or granules that may pass in between the tines. In this example, the front edges of tines 301 are flared outward to urge the material to break apart easier.

The broken up poultry litter passes in between the tines along the direction of the arrows pointing toward augers 207. Augers 207 depict a flute direction that displaces the broken litter from the outside inward along the direction of the opposing arrows pointing toward center of the drawing. This accumulation of litter forms a central row of litter for supplementation and blending that is higher than surrounding litter. Blending tools 209 rotate to blend or mix supplements or added agents into the litter. In this embodiment, tools 209 contain protrusions or tines 302 that are presented in a staggered pattern about each tool.

In this case tools 209 are interchangeable and may be classed as the same part. In one embodiment, protrusions 302 are removable and replaceable with new protrusions. The staggered pattern of protrusions helps to mix the litter more thoroughly. In this example, protrusions 302 are rigid and are rotated laterally through the litter row. In one embodiment, protrusions 302 may be inserts that are flexible or flex to stir material about from side to side as they are rotated through the material. A combination of rigid and flexible protrusions may also be implemented. In still another alternative embodiment, the function of tools 209 may be provided with a radial implement that may be mounted on a short vertical spindle and that may include downward facing protrusions that rotate about in a circular pattern to mix the row of litter.

Much of the litter worked by the blending implement stays near the center of the footprint beneath the vehicle until augers 206 pass over to spread the litter back out from the center by virtue of opposing flute direction on the mounted augers 206. The accompanying arrows depict outward direction for the litter. As the vehicle may be traveling few feet per second, the gear ratios between the tracks and augers and blending tool may be manipulated such as "two-to-one" ratio for the augers to the track wheels to achieve higher rotational speeds for the rotating implements. At the rear of the work area, litter that has been worked is leveled by the leveling plate 122.

Figure 4:
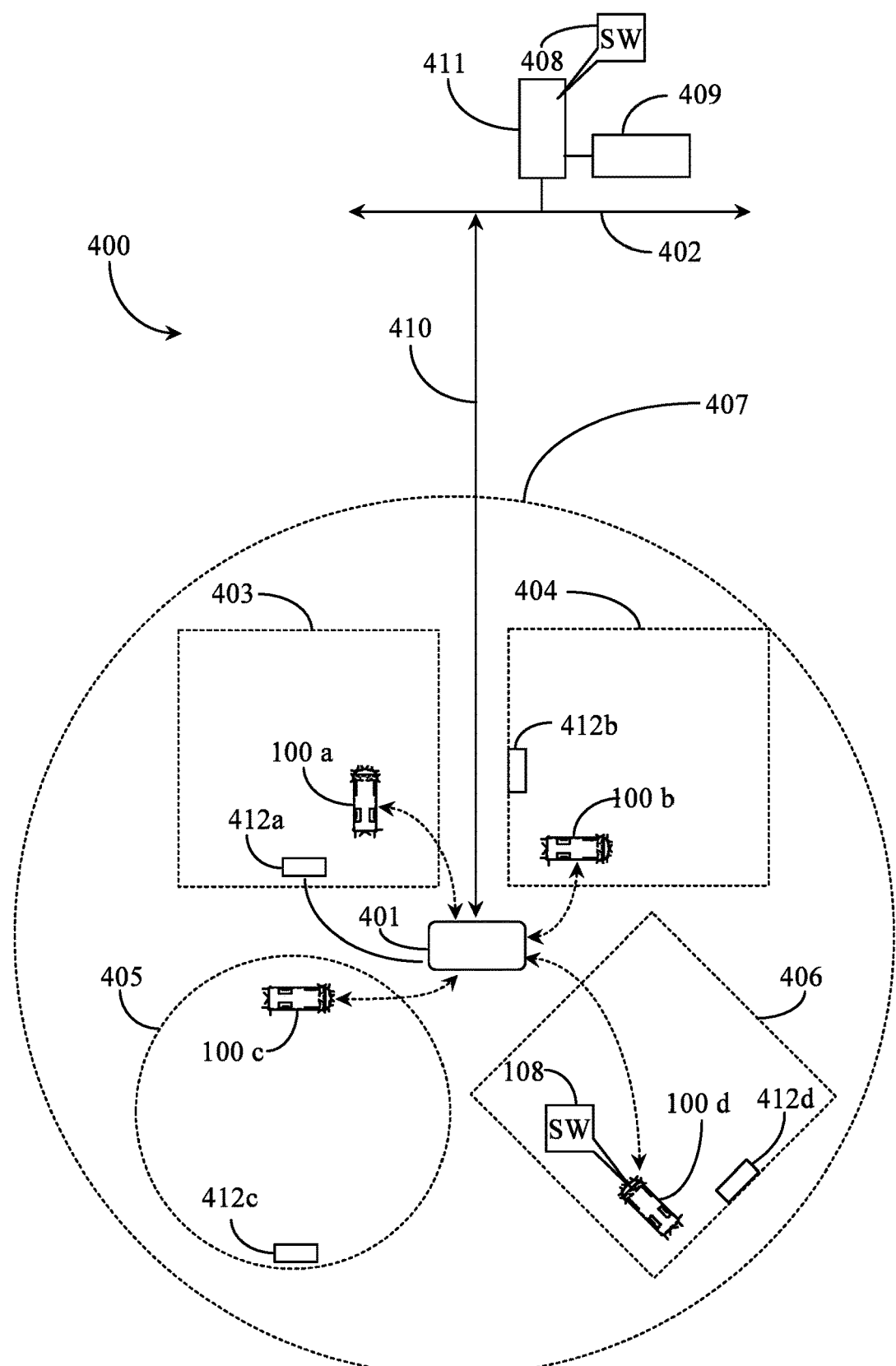
FIG. 4 is an architectural overview of a communications network supporting remote communication between a network server and a plurality of robotic agro tilling vehicles according to an embodiment of the present invention.

FIG. 4 is an architectural overview of a communications network supporting remote communication between a network server and a plurality of robotic agro tilling vehicles like vehicles 100*a-d* according to an embodiment of the present invention. Referring now to FIG. 4, a communications network 400 is depicted whereby a multitude of vehicles (100) may cooperate to work several different areas or buildings at a local vicinity in a manner that may include use of machine intelligence both for immediate navigation within areas treated and for potential collaboration including team work cooperation between a plurality of vehicles. In this example, network 400 includes a wirelessly enabled router or communications hub 401. Hub 401 may be in wireless communication with vehicles 100, of which there are four in this example. Hub 401 may be connected wirelessly or by cable 410 to a local or regional data network depicted herein by a network backbone 402. Backbone 402 may be a local area network (LAN) accessible to employees of a poultry farm or collective.

Hub 401 has wireless network connection for communication to vehicles 100a-d within buildings or areas 403, 404, 405, and 406. These areas may be poultry houses or enclosed areas containing litter for treatment. In this case, each boundary may represent the total area of litter to be treated at each building or location. In this example, each vehicle 100a-d has an in-house charging station. Vehicle 100a in enclosure 403, which may be similar to vehicle 100 of FIG. 1 uses charging station 412a. In enclosure 404, vehicle 100b, may use a charging station 412b, 100c uses charging station 412c in enclosure 405 and vehicle 100d may use charging station 412d in enclosure 406.

Vehicles 100b-d may be formatted with components according to FIGS. 5 and 6, below, or alternatively be designed for a specific purpose. For example, one of vehicles 100b-d could be used only for aerating litter with auger shafts and tilling plate, one of the vehicles may be only for applying agents such as insecticides, PH balancing agents, drying agents, ammonia neutralizing agents and other enzymes. One of the vehicles may only be used for testing the litter, sending results to software 108 and/or 408, thereby enabling the software to alter or change how the vehicles are processing the litter in order to achieve maximum results.

Network 402 may, in one embodiment be the Internet network without departing from the spirit and scope of the present invention. The Internet may be a carrier for remote monitoring of vehicles 100a-d such as by an owner, a maintenance team, or a business that may monitor different groups of vehicles distributed to sites covering a broad region.

Network 402 may be a local network operated on premises, the network including a server 410 hosting a software (SW) application 408 and at least one data repository 409 for storing data. SW 408 may be a parent or controlling application wherein application 108 hosted on the vehicles 100a-100d may be a child or controlled application that reports to the parent. Vehicles 100a-d may be enabled by SW 108 to compile data during operation and forward that data for analysis and storage to server 411 executing SW 408. Data reported may include sensor data, time in operation, battery level, repair state, on-board supplement levels, obstacle location within an enclosure, size of the enclosure, orientation of the enclosure, for example facing North to South or East to West. Vehicles 100a-d may travel between enclosures 403-406 using GPS navigation data that may be supplied as an on-board functionality.

Vehicles 100a-d may receive information and instruction from server 410 running SW 408, based on each vehicles specific capability and component installation and sensor capability. Server 410 may be a computing device operated by a farm manager, for example, that has control through the device of all of vehicles 100a-d via their local processors and software. In one embodiment a server routine that may be part of SW 408 may boot vehicles 100a-d according to a preplanned schedule of work periods. Sensor and other data taught above may be sent to server 410 and stored in repository 409. The data may be utilized by software 108 and 408 to inform such as which of enclosures 403-406 need litter processing, which ones have been completely processed, which ones are still being processed and so on. In this manner if one vehicle is finished at one enclosure, it may travel to another enclosure being processed and aid in such processing in tandem with another vehicle. Additionally, there may be an ideal or several acceptable thresholds of litter condition set in the vehicles or at the server, wherein the vehicles 100a-d continue processing as assigned until the thresholds are met, as detected by the onboard sensors and further lab testing.

In one embodiment, vehicles 100a-d may share information and requests between themselves. In one example one vehicle may evaluate that at current speed and processing it will require a second vehicle to complete a previously designated area within a given time frame and send a request to an "open" or "idle" vehicle stationed nearby. In one embodiment where network 402 is or has access to the Internet, vehicles 100a-d may gain intelligence from mapping services, for example, pertaining to the NSEW orientation of a building or enclosure, including exception walls or boundaries.

In this case a vehicle may, using an internal building map, GPS and "orientation data", plan to hold a specific orientation when moving such as parallel to the main walls and or boundaries of the enclosure. Hence for enclosure 405, which is annular, the vehicle 100c may determine the estimated diameter of the circle and plan to travel in a circular track with a specific turn radius that changes at next track out or in depending on where the vehicle starts at the edge working inward or in the center working outward. Enclosure 406 is rectangular but is orientated at a South West to North East alignment. Vehicle 100d may take this data and plan parallel tracks along the stated orientation of the building. If an obstacle forces a vehicle off of "track" direction, the vehicle may, after moving around or otherwise avoiding the obstacle via sensor input, get right back on track. Additionally, vehicles 100a-d may be equipped with arms and levers capable of lifting and/or moving obstacles out of litter processing paths determined by the software 108 and 408.

Size estimates of the enclosure may, in one embodiment, be sent to any or all of vehicles 100a-d wherein the vehicles may then estimate, via software 108, how much time to complete a task or if the current battery level will have to be adjusted through charging during the operation. Data stored in repository 409 for a particular enclosure over time (History) may include sensor readings over the time, supplement use and amounts, average temperatures found, areas of an enclosure found to consistently dryer or moisture over time, etc. Such data may be implemented to refine process instructions fed to the vehicles 100a-d or that are downloaded for vehicle execution from the server.

Applicant's invention also envisions implementing Artificial intelligence (AI) as intelligence exhibited at the server and on board vehicle processors. Each vehicle 100a-d may operate as an intelligent agent, perceiving its environment and maximizing actions thereby increasing its chance of success at reaching a specific threshold of litter condition. Colloquially, the term "artificial intelligence" is applied when a machine mimics "cognitive" functions that humans associate with other human minds, such as "learning" and "problem solving" (known as Machine Learning).[2] As machines become increasingly capable, mental facilities once thought to require intelligence are removed from the definition. For instance, optical character recognition is no longer perceived as an example of "artificial intelligence", having become a routine technology).[3] Capabilities currently classified as AI include successfully understanding human speech,[4] competing at a high level in strategic game systems (such as Chess and Go[5]), self-driving cars, intelligent routing in content delivery networks, and interpreting complex data.

Figure 5:
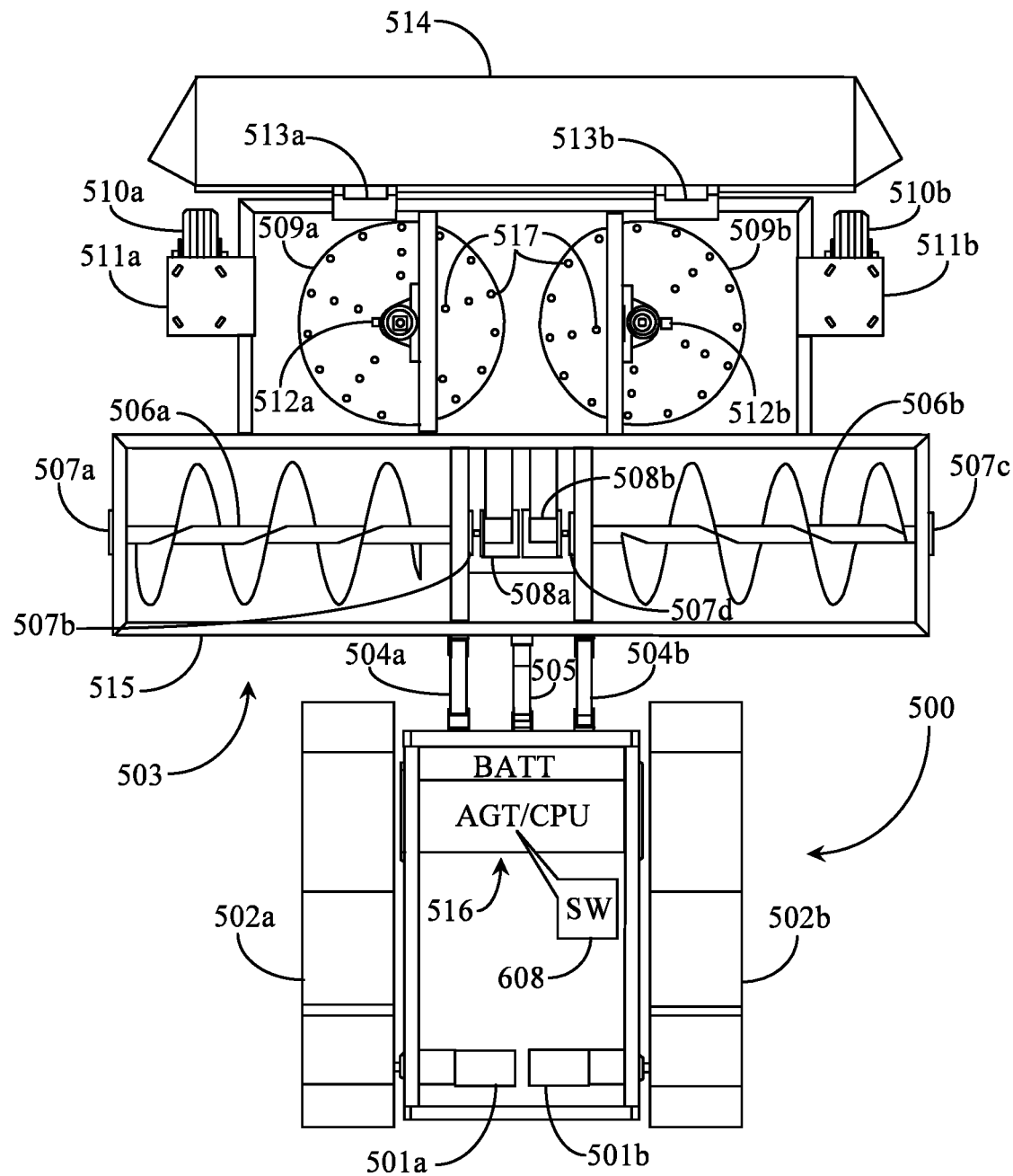
FIG. 5 is an overhead view of a robotic vehicle coupled to an agro tilling station according to another embodiment of the present invention.

FIG. 5 is an overhead view of a robotic vehicle 500 coupled to an agro tilling station according to another embodiment of the present invention. Vehicle 500 may includes two travel tracks 502a and 502b. Tracks 502a and 502b may include an active suspension system, multiple roller wheels, a drive wheel and aggressive or biting tread for traction on a wide range of bedding materials. The contact surfaces of tracks 502a and 502b may be grooved, patterned (diamond) or broken (pattern of cutouts) in order to maintain excellent traction through dry and wet litter. Tracks 502a and 502b may be driven by planetary gear motors 501a for track 502a and 501b for track 502b. In another implementation, a single motor may operate both tracks without departing from the spirit and scope of the present invention.

Vehicle 500 includes an agro tiller central processing unit (AGT/CPU) and a supporting battery or battery set 516. Solar or rechargeable batteries may be used and vehicle 500 may dock at a charging station to recharge batteries as described with respect to FIG. 4 above. In this implementation, vehicle 500 includes SW instruction 608 executing from battery supported CPU 516. SW 608 may be capable of communicating with other vehicles and the server 411, as described above, and include all of the instructions for navigating, tilling, treating litter, and processing results of sensor readings and litter sampling and on-board litter testing. SW 608 may be a child or client application to a parent or controlling application run on a network server, such as server 411 or network-connected device as was described further above relative to SW 108 on vehicles 100a-d of FIG. 4.

In this example, vehicle 500 is coupled to an agro tilling (litter processing) station 503 that may include all of the mechanical components needed for breaking up and processing the litter materials. Such a coupling may be made, in one implementation, via pivotal arms 504a and 504b, and a telescopic tube housing 505 also mounted in a fashion as to allow for pivoting. Tube housing 505 may encase wiring such as sensor wiring and power wiring from vehicle 500 to coupled processing station 503. No sensors are depicted in this example but they may be assumed present as strategically required for pretesting litter before treatment on vehicle 500 (underside) and also on processing station 503 as strategically required for post treatment and testing for litter condition or state changes as described relative to vehicle 100 of FIG. 1. For example, a PH sensor or an ammonia sensor may be located at the front underside portion of vehicle 500 and like sensors may be located underneath station 503 toward the rear. In such an embodiment, the sensors on the agro tilling station that is towed by vehicle 500 may be coupled to the battery powered CPU (516) through tube 505.

In one implementation, agro tilling station 503 is coupled to vehicle 500 physically by a user before work begins on an area of unprocessed litter. In another implementation, vehicle 500 equipped with navigation and proximity sensors may self-couple to station 503 such as if station 503 is docked at a geographically disclosed location known to vehicle 500 for coupling and release after coupling. In such an implementation, the coupling arms 504a and 504b and telescopic tube 505 may have one end adapted with a quick coupling mechanism on the vehicle side and may be presented in a position for coupling by the docking bay. Complimentary coupling components may be fixed to the rear of vehicle 500 in order to enable such as a position-and-reverse coupling event whereby vehicle 500 may self-couple with station 503. There may be optical sensors placed about the outside and front of vehicle 500 and on the outside or at least the sides of agro tilling station 503 to assist in avoiding obstacles as in this case the agro tiller is somewhat wider than the host vehicle.

Agro tilling station 503 includes a rigid frame work or chassis 515. Chassis 515 may be a box like frame construction welded or bolted together and covered with a durable sheet metal to protect internal components form dust, stray litter, or other foreign elements. Vehicle 500 may also be covered with a sheet metal body for the same purpose. Cut-outs in the sheet metals for covering both vehicle 500 and processing station 503 may be strategically placed so as to enable access to certain compartments and areas of the machines that require human access for maintenance, material distribution, material storage, etc. For example, a compartment door may be provided to cover vehicle CPU and battery 516 as well as another compartment door for covering motors 501a and 501b. Sheet metal and or installed polymer fabricated compartments or vessels (not illustrated) may be added to station 503 for the purpose of dropping or otherwise dispersing litter treatment materials that might be mixed into the broken litter during litter processing.

Structure 515 includes, in this embodiment, a pair of opposing auger screws depicted herein as an auger screw 506a, and an auger screw 506b. Auger screws 506a and 506b include helical flutes structures that are oriented one opposite of the other such that the helical rotation during operation functions to gather litter from the outside of the work area and to urge the litter toward the center of the station forming a center row of piled litter. Auger screws 506a and 506b may be fabricated of steel.

Auger screws 506a and 506b include a strategically machined female D shaft connection for rigid and quick attachment and mounting to individual (one per auger screw) geared motors mounted in position on structure 515. Auger screws 506a is operated by a geared motor 508a while auger screw 506b is operated by a geared motor 508b. Motors 508a and 508b may be adapted to provide varying rotational speeds during operation that may be proportional to the travel speed of vehicle 500. Motors 508a and 508b may be connected to individual motor mounts (not illustrated) which in turn, may be mounted to a sheet metal motor casing (not illustrated) that may protect the motors from exposure to the environment. Motors 508a and 508b are in this embodiment, mounted to frame members of structure 515 and are presented in alignment with auger screws 506a and 506b. However, that should not be construed as a limitation of the present invention as auger screws 506a and 506b as well as motors 508a and 508b may include an amount of flexibility in mounting to provide some flexibility in operation without departing from the spirit and scope of the present invention.

Auger screws 506a and 506b may be mounted to structure 515 via a custom sheet metal and aluminum composite bearing housings illustrated herein as bearing housings 507a and 507b for auger screw 506a, and as bearing housings 507c and 507d for auger screw 506b. Bearing housings 507c and 507d may be integrated with or otherwise mounted to the aforementioned motor casings which may be fabricated of sheet metal and or aluminum. The bearings utilized in bearing housings 507a through 507d may be grease packed steel bearings selected for their ingress protection and load capabilities. In one implementation only two bearing housings may be required where a clearance or relief opening may be provided in the structure wall where the augers connect to the motor shafts.

Agro tilling station 503 may include a pair of circular harrow plates depicted herein as a harrow plate 509a and a harrow plate 509b. Harrow plates 509a and 509b are circular steel plates having a thickness and a diameter and a collective radial coverage area substantially equal to the work space beneath the tiller station. Harrow discs 509a and 509b each may include a plurality of rods or structurally sound tines 517 installed on the undersides of each disc and extending downward at strategic lengths and at specific angles so as to reach down into the litter. In this implementation, each set of mounted rods 517 presents a star pattern from disc center to edge with a perimeter array enclosing each star pattern. The downward angle of extension for each tine 517 collectively function to create a self-rotating disc as the rods are dragged through the litter by forward motion of vehicle 500. Another embodiment may allow for motor installation in order to power the rotating discs.

The offset angle for each rod relative to disc surface may be approximately 30 degrees. The angled placement of tine 517 may cause each harrow 509a and 509b to rotate towards in opposing directions toward the center of the work area beneath the station to further mix the bedding introduced by augers 506 and assist with redistribution of the bedding or litter, typically after treatment or in the case of breaking up of the litter when no treatment or additives may be required. Harrow plates 509a and 509b may be constructed from a metal plate with mounting holes for tines, or they might also be constructed from bent tubing with radial spokes where mixing rods can either be welded to the structure or mounted via nuts and washers onto the radial spokes.

Each harrow plate or disc 509a and 509b may be mounted to a bearing block illustrated herein as a bearing block 512a and a bearing block 512b. Bearing blocks 512a and 512b may be mounted to cross frames of rigid structure 515. In one implementation, each harrow plate 509a and 509b include a vertical steel shaft with a threaded opening for the purpose of bolting each plate in position onto the frame mounted bearing blocks 512a and 512b.

The speed of rotation for each harrow plate 509a and 509b may be constant and proportional to the speed of travel of vehicle 500. As such these speeds may vary from one another such as when turning sharply. In one embodiment harrow implements 509a and 509b may each have height adjustment mechanisms for adjusting the depth of the downward facing tines or rods into the litter being worked. In one embodiment an automated servo assisted adjustment mechanism may be provided to automatically adjust depth of tilling that might be operated from vehicle 500 based on data sensed by a depth sensor or based on data from a mechanism such as a depth probe that may be hosted on vehicle 500 and may be used to mechanically measure the viable workable depth of the litter or bedding.

Litter tilling station 503 includes a pair of freely pivotal tires depicted herein as a tire 510a and a tire 510b. Tires 510a and 510b are freely pivotal and mounted with castor hardware to a pair of mounting plates depicted herein as mounting plate 511a and mounting plate 511b. Tires 510a and 510b may be rubber tires or a rubber and polymer composite tire that may be inflated and deflated. Mounting plates 511a and 511b may be bolted to or otherwise fixed including by welding to frame members of structure 515. In one implementation, height adjustment hardware may be added to the castor hardware to enable individual height adjustments to be performed for each tire. It is noted herein that the term tire as used herein may refer to the wheel rim and axle for the purposes of discussion. Tires 510a and 510b enable sharp pivot moves to be conducted by vehicle 500 while towing tilling station 503 and may prevent the litter processing station from dragging on the ground behind vehicle 500.

Station 503 includes a rear leveling plate 514 that may drag on the ground behind station 503. Leveling plate 514 functions to level the broken up and treated litter as it is dragged over the work area by vehicle 500. Leveling plate 514 may be a reinforced sheet metal structure that may or may not include a framing component. Leveling plate 514 may also be a steel plate without departing from the spirit and scope of the invention. Leveling plate 514 may be connected to a lateral frame member of structure 515 at the rear of tilling station 503 via a pair of hinges depicted herein as a hinge 513a and a hinge 513b. Hinges 513a and 513b may be piano style hinges that may allow a rearward and downward angle for leveling plate 514 to reach ground level.

In one implementation, leveling plate 514 may be weighted to provide better leveling action with respect to the litter. In one implementation hinges 513a and 513b may be spring loaded such that the spring tension acts to urge the back edge of plate 514 down against the litter. In one implementation, leveling plate may include strategic bends in the structure at both lateral edges thereof to help contain the processed liter to the specified work area of the treated liter to produce a more defined and compact bed of litter.

Compartments (not illustrated) for holding various treatment agents and or materials may be presumed present in this embodiment. None are illustrated here so as not to obscure the internal components. Liquid and or dry material containers and attached dispensing systems such as a dry shake distribution mechanism and or an automated spray system (liquid) may be provided on the sheet metal structure 515 at strategic locations that enable optimum distribution as may be required depending upon the treatment function being conducted.

In use of vehicle 500 and tilling station 503, once coupled and operational, the vehicle may navigate with the aid of GPS information and optical sensor and proximity sensor information to a position where operations might begin within an area of untreated litter to be processed. The vehicle may perform testing on the litter using various sensors such as an ammonia sensor, and a PH sensor, for example. Vehicle 500 may also utilize other sensors adapted to provide proximity and obstacle detection and avoidance while traveling. Travel speed may in part be dictated on the type of testing performed and how much time might be required to disseminate sensor readings or test results made by chemical insertion test mechanisms or swab testing described further above in the specification.

Sensors may include sensors that measure the amount of gas trapped in litter. The gases that will be monitored are ones that have been deemed hazardous to the health of animals such as poultry and even human's health. Sensors may in one implementation be provided for microbial, insect (pest), and pathogen detection and may be coupled with litter sampling apparatus such as a mechanical scoop, a swab, or an absorbent swatch of material. Collected litter or residue such as on a swatch or swap may be stored and later analyzed, such as at a docking station having a facility for receiving and analyzing samples. Samples may be manually collected for further lab testing, automatically deposited at a testing station or kept on board if automated testing apparatus is made available on a robotic vehicle. Corrective additives that might be distributed into the litter may include but are not necessarily limited to probiotics, prebiotics, bacteriophages, insecticides, disinfectants, and any other liquid or powder additive that may be deemed necessary to mix into the litter based on the sensor data that is collected. Typical additives may be designed to maintain a neutral pH, reduce moisture content, and to suppress any harmful gasses detected in the litter. Supplemental additives may be applied in measured amounts and timed introduction according to analysis of data collected. Litter or bedding may be treated before introducing animals, during their presence, and after their removal from the area.

It may be noted herein that vehicle 500 in addition to structure 515 of tilling station 503 may include a sheet metal protective enclosure or body to prevent poultry or other animals from coming into contact with moving components and to provide ingress protections against the elements such as dust, manure and other elements that might otherwise enter the mechanics of the system. Such an enclosure or body such as described with reference to FIGS. 1 and 2 of this specification may also provide locations for sensors adapted for obstacle avoidance and sensors for detecting bedding anomalies. Tracks 502a and 502b are to be attached to vehicle 500 via custom sheet metal mounting plates, in addition motors 501 will also be attached to this custom mounting plate.

After initial litter analysis augers 506a and 506b may be activated to gather material into the center portion of the work area. As the material is broken up and collected it might be treated at this point before mixing and redistributing the materials using the harrow plates and eventually the leveling plate. This should not be construed as a limitation of the invention as some treatment may be applied at the back end just before or after leveling. In one embodiment, a vehicle such as vehicle 500 may pause in the process of traveling through litter and may direct with the aid of SW 608 that certain litter working implements to keep turning and perhaps increase or decrease in speed of rotation. In another embodiment, the speeds of rotation of these implements may be partly tied or directed by program or by gearing to the actual speed of travel of the vehicle as described further above in this specification.

Figure 6:
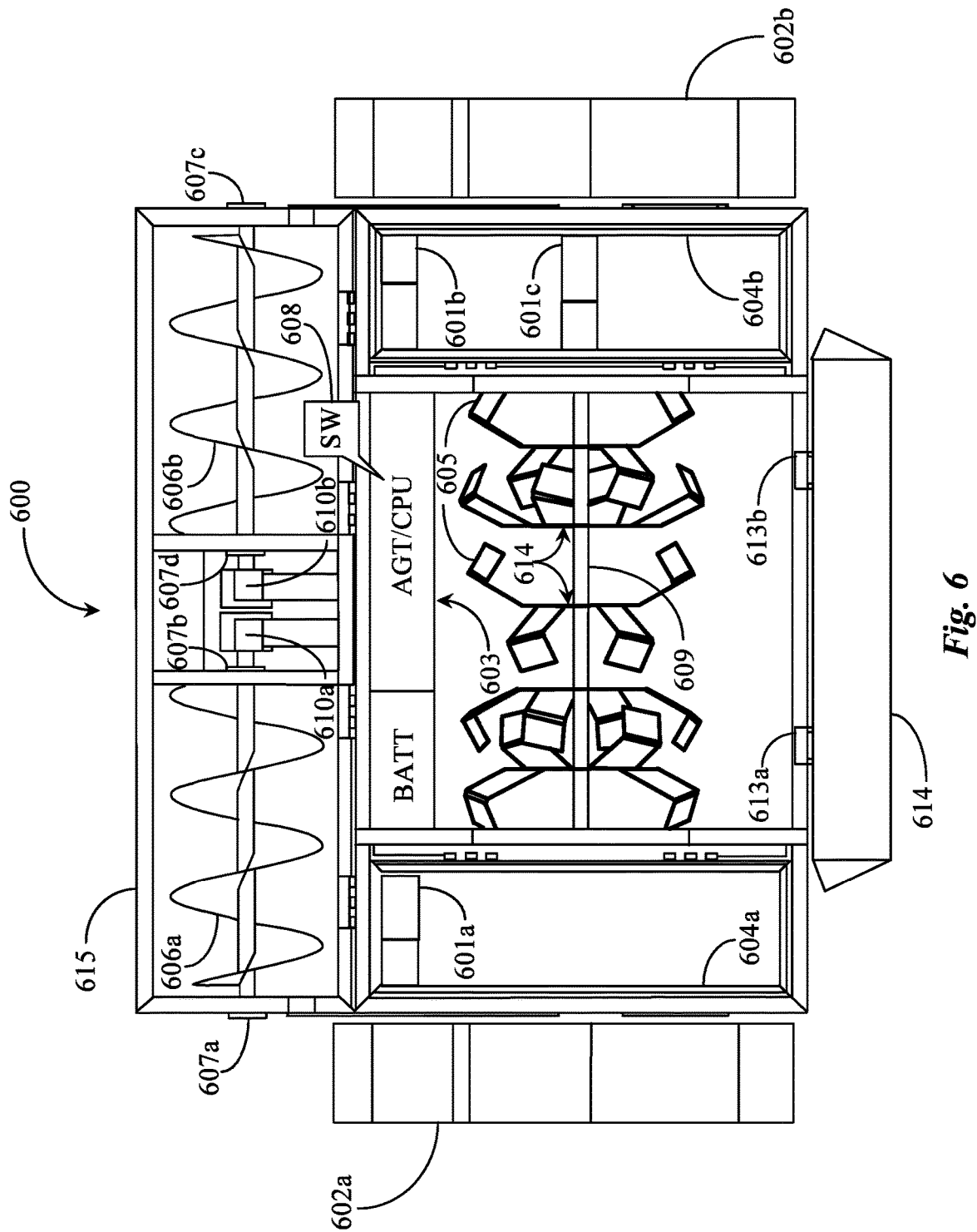
FIG. 6 is an overhead view of a self-guided agro tilling machine according to a further embodiment of the present invention.

FIG. 6 is an overhead view of a self-guided agro tilling machine 600 according to a further embodiment of the present invention. Machine 600 is a self-guided robotic vehicle that includes a track system comprising a track 602a and a track 602b which are analogous in this embodiment specific to design and function to tracks 502a and 502b described above with reference to FIG. 5. In this implementation, vehicle 600 includes a rigid frame structure 615. A pair of auger screws 606a and 606b are mounted within structure 615 using bearing housings 607a, 607b, 607c and 607d in the same fashion as on tilling station 503 of FIG. 5 with reference to auger screws 506a and 506b.

It is noted that auger screws 606a and 606b as well as bearing housings 607 (a-d) are analogous both in design and function to the counterparts depicted in FIG. 5 relative to screws 506 (a,b) and bearing housings 507 (a-d). It is also noted that there may only be two bearing housings, one for each auger screw at the end opposite the associated motor. In this case motors 610a and 610b are analogous in function and design to motors 508a and 508b of FIG. 5. It may be further noted that bearing housings 607b and 607c as well as counterparts of FIG. 5 (507b and 507c) may include central through openings that enable pass through of the auger screw shaft to connection with respective drive motors. In one implementation, bearing housings located adjacent to the drive motors are optional without departing from the spirit and scope of the present invention.

The mixing mechanisms located between the auger screws and leveling plate are not limited to horizontally presented harrow plates such as plates 509a and 509b of FIG. 5. In one implementation another shape of harrow plate may be implement such as a diamond shape without departing from the spirit and scope of the invention. In this embodiment, a mixing (tilling) tool 609 is provided to rotate through the gathered litter and mix with the aid of a motor 601c. In one implementation, one or more bearing housings may also be implemented. As well more than one motor may be used to drive tool 609. Tool 609 is a laterally mounted shaft supporting a plurality of tilling wheels 614. Tilling wheels 614 may have tines 605 offset in angle from the disc edge by bending or forming such as about 10-20 degrees and every other tine 605 angles in the same direction. Each individual tine 605 on wheel 614 has a paddle end formed or bent at a second angle such as 30-50 degrees from the first 10-20 degree bend of the tine. They also include a twist in each tine to complicate the angle giving some lift function to the paddles. The exact angles of bend of the paddle ends may vary from tool to tool the stated angles for the tine and paddle bend serve as one example for discussion purposes only. In one implementation, the tine may be formed along a specific radius that include the paddle portion of the time, for example. Tool 609 may be operated at variable speeds and may be operated in forward or reverse if desired.

Vehicle 600 includes a battery assisted AGT/CPU 603, analogous to CPU 516 of FIG. 5. CPU 603 may also host SW 608. In one implementation, a mixing implement need not be powered by a motor as depicted herein. Tilling tool 609 may be connected to a variable speed motor for independent rotation. Tilling tool may instead be connected to the drive axle of the track system by a reducer gear or a gear that multiples rotation speed relative to the track wheels' rate of rotation. not connected to the drive mechanism of the robotic vehicle without departing from the spirit and scope of the invention. Robotic vehicle 600 includes a leveling plate 614 that may be hinged to structure 615 by a hinge 613a and a hinge 613b. Plate 614 is analogous to plate 514 of FIG. 5.

Referring now back to FIG. 5, Structure 515 may be fabricated with a minimum height profile so as to have sufficient clearance to enable the auger screws 506a and 506b to extend partly beneath adjacent feed and water lines. In this way tilling station 503 may be towed parallel or adjacent to existing feed and water lines whereby the auger adjacent to the obstacle may extend partly thereunder and gather litter with a higher waste and or moisture content to be mixed with drier and cleaner litter gathered from the opposite side of the vehicle away from the feed and water lines. Sensors alongside the edge of vehicle 500 and located on structure 515 may provide the appropriate proximity information for vehicle 500 to efficiently navigate alongside feed and water lines in this embodiment without disrupting them.

Vehicle 500 with attached structure 515 is to navigate to a home station for recharging, cleaning and possible data up link with a server or network-connected computing appliance when required, if not communicating by wireless means. This recharging system may be directly connected to an AC circuit, or may utilize solar energy to charge a battery bank. A solar panel may also be able to power an electrolysis process which may produce hydrogen from water. Hydrogen can then be passed through a hydrogen fuel cell system (not illustrated) where the total power output may be greater than that produced by the solar power alone.

A combination home/charging station may also include a facility for cleaning structure 515 and vehicle 500 through the use of pressurized air and or water jets placed in specific positions to clean the mixing components. The home station will also be the central communication device for sending data between the vehicle 500 and a central control station that oversees the entire operation. As described previously, vehicle 500 will collect bedding samples for microbial and pest detection. These physical samples can be deposited at the home station where it can be analyzed by on board systems or collected for further lab testing. Additionally, the server may collect the raw data from the sensors in order to make the calculations and decisions required to operate the vehicle.

Structure 515 may support a variety of compartments and or vessels, bins, spray containers, drip containers, to carry liquid, powder, and in some cases solid or granule additives where appropriate for processing and that may be distributed in a timed and in measured amounts into the mixing mechanisms. Distribution of treatment materials or supplemental materials may be performed at rates that may result from analysis of sensor data from bedding sensors detecting moisture or saturation states, ammonia levels, nitrogen levels, acidic levels, bacterium levels, presence of parasites, etc. SW 608 may prescribe the specific chemicals to be added into the mixing operations. Rates might vary according to velocity, rotation rate of augers 506a and 506b, or even SW instruction that may be computed on board based on sensor data dissemination and analysis.

Referring now back to FIG. 6, compartments 604a and 604b are provided and configured at each side of mixing tool 609. Compartments 604a and 604b may be further divided into more compartments. Liquid delivery systems may also be mounted to structure 615. In one implementation, a goal of vehicle 600 may be to identify poultry and target them for spraying such as a treatment chemical for mites, ticks or other pests or diseases. In another embodiment, vehicle 600 may include an air compressor with a positional nozzle for blowing debris aside or way from treatment areas. There are many possibilities for implementing accessory tools or systems that may perform dedicated functions that may also be sensor driven and directed or controlled by running SW 608. Spreader devices for powders might, for example, be provided and mounted for use on vehicle 600 or station 503 described further above. Gravity feed or shaker box feed mechanisms might also be provided. Liquids may be distributed by spray mechanism connected to a reservoir pump or to a compressor mounted to the machine.

One with skill in the art of automated dispersal of powder and liquids will appreciate that SW 608 relying on sensor data may compute correct amounts of additive to be dispersed into the litter and may compute the frequency of dispersal events and then may direct individual dispersal systems controlled by solenoid switching to make the correct amounts of dispersal at the appropriate times. The process may be fluid such that when sensors are not detecting anomalies in a certain area of litter dispersal of additives may not be required. When sensors begin again to sense anomalies in the litter such as in a new untreated area or section navigated, the dispersal of the additives may initiate again. Vehicle 600 may monitor amounts of additives stored on board for dispersal in real time and may predict when a vehicle must stop and be refilled with more additives.

In one embodiment treatments of areas where the square footage is known, base data describing a prescribed area coverage in square footage may be treated by a total amount of additive is programmed into memory by a user accessing the robot control system with the aid of SW 608 and a remote computer connection such as a USB connection or wireless communication channel such as Bluetooth™, and the server 411 may assist in the control. It may be said that these base figures for square foot coverage may be altered by SW 608 during operation, for example if it is determined that not all of the acreage has the anomaly that the additive will treat or neutralize. After covering a portion of an area with sensors running it might be determined that less of the additive will be required for dispersal on average. One or more predictive algorithms may be provided to enable such predictive analysis and decisions.

Referring now to FIG. 5, vehicle 500 with attached structure 515 may navigate to a home charging station for recharging, deck cleaning and data up linking (to third party) or server 411 as described relative to FIG. 4 for vehicle 100 and charging stations 412 (*a-d*). This recharging system can be directly connected to an AC circuit, or utilize solar energy to charge a battery bank. It may also serve as a docking station for the towed tilling station. Vehicle 600 described with reference to FIG. 6 may also be a hybrid of hydrogen gas powered and solar battery powered.

Vehicle 500 and all of the versions of robotic vehicles described herein may in one implementation, utilize an indoor tracking and or guidance system that may be adapted through SW and communications means available to the inventor to enable the robotic vehicles to successfully navigate and to be able to optimize navigation procedures. This might be achieved through a path mapping and localization system that may utilize provided stationary ultrasonic beacons linked via a radio interface tuned to a license free radio band. With such localization hardware and software (608) running on the CPUs of the vehicles and software 408 of server 411, motion and path finding and tracking algorithms may be developed and repeatedly executed in a machine learning environment.

Mapping procedures (path tracking), obstacle avoidance, and use of beacons to aid location discovery and path mitigation may also be practiced. Sensors useful for obstacle avoidance and for obstacle-based presence navigation may include such as LIDAR sensors, infrared sensors, ultrasonic sensors and physical proximity sensors. FIG. 1, FIG. 2, and FIG. 4 above illustrate how sensors may be added to a robotic agro-vehicle such as vehicle 500 and vehicle 600. Therefore, a robotic vehicle such as those versions thereof described in this specification may have the capability of mapping a room or updating a room mapping, enclosure or an area and to incorporate optimal navigation paths both for working the area and for traversing to a home charging station for services that may include data linking and vehicle maintenance and or cleaning.

In one embodiment a charging station also referred to as a home station may also function to spray wash or otherwise clean robotic vehicles returning from operation. Such implements might include pressurized air, or water jets placed in specific positions to clean the mixing components. The home station will also be the central communication device for sending data between the robot and a central control station that oversees the entire robot operation including tracking vehicle-to-vehicle direct communication. As described previously, vehicle 500 may collect bedding samples for microbial and pest detection. These physical samples can be deposited at the home station where they may be analyzed by inboard systems or be collected for further lab testing with results entered as described above.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A robotic litter processing system, comprising:
a first robotic litter processing vehicle including;
an elongate housing with a length, width, front, rear, top, center and two opposing sides creating an inner space for mounting components;
an on-board processor having software executing from a non-transitory medium;
a plurality of sensors communicating raw data at least to the processor;
at least two rotatable parallel tracks operated by a motor and axle assembly and controlled by the software providing mobility for the vehicle over the litter;
a litter accumulating auger shaft mounted laterally in the front housing making contact with the litter, having auger flutes in a spiral formation positioned on the auger shaft forcing the litter to the center of the housing;
a computerized server storing and executing an instance of the software, communicating wirelessly with the processor;
wherein the sensors include at least optical sensors gathering first data including at least stationary and mobile obstacles, communicates the first data to the processor wherein the software assists in navigation of the vehicle to avoid making contact with the obstacles.

2. The litter processing system of claim 1, wherein a spreading auger shaft is installed laterally towards the rear of the housing having auger flutes in a spiral formation angled to spread litter away from the vehicle towards the two opposing sides.

3. The litter processing system of claim 2, wherein a mixing auger shaft is installed longitudinally between the litter accumulating and spreader auger shafts including means for mounting litter blending protrusions and apertures including at least tines for mixing the litter.

4. The litter processing system of claim 1, wherein the tracks are located between the center and front of the housing and a tilling plate is positioned between the tracks and the litter accumulating auger shaft, the tilling plate including an angled sharp edge extending towards the tracks having teeth and slots allowing litter to pass between the teeth, a leveling plate is positioned at the rear of the housing, supporting the vehicle.

5. The litter processing system of claim 1, wherein one or more of the sensors are moisture, PH, temperature and ammonia sensors located near the front of the housing making contact with the litter sending second data to one or both of the processor and server.

6. The litter processing system of claim 1, wherein the housing includes means for storing dry and liquid litter treatment agents above the mixing auger shaft, means for dispensing the dry and liquid agents, the software determining types of treatment and type of agents dispensed based upon the second data.

7. The litter processing system of claim 6, wherein the agents include any one of liquids and solids comprising at least specific enzymes, drying agents, moisturizing agents, ammonia neutralizing agents, and PH adjustment agents.

8. The litter processing system of claim 6 wherein one or more of the sensors are also located at the rear of the housing after the spreading auger shaft, making contact with the litter and sending third data to the processor.

9. The litter processing system of claim 8, wherein additional vehicles are employed in the system to perform specific additional litter processing jobs controlled by the software via direct communication between the vehicles or from the server, based at least upon the third data.

10. A method for processing litter, comprising the steps of;
a) providing a robotic vehicle having an elongate housing with a length, width, front, rear, top, center and two opposing sides creating an inner space for mounting components;
b) operating the vehicle via a local processor storing and executing an instance of operating software and cooperating with an instance of the software stored on and executing from a computerized server wirelessly connected to the processor;
c) mobilizing the robotic vehicle, by the software, to traverse livestock litter by operating at least two rotatable parallel tracks mounted in the housing via a motor and axle assembly providing mobility for the vehicle over the litter;
d) gathering raw data by a plurality of sensors mounted on the vehicle and communicating the raw data to the processor;
e) gathering first raw data by the sensors including at least an optical sensor detecting at least stationary and mobile obstacles, communicating the first data to the processor and the software navigates the vehicle to avoid making contact with the obstacles
f) accumulating litter by a first auger shaft mounted laterally in the front of the housing making contact with the litter, the first auger shaft having auger flutes in a spiral formation positioned to force the litter to the center of the housing.

11. The method of claim 10, including a step for spreading litter away from the vehicle towards the two opposing sides by a second auger shaft having auger flutes in a spiral formation angled to engage the litter forcing it towards the two sides, the second auger shaft installed laterally towards the rear of the vehicle.

12. The method of claim 11, wherein a third auger shaft is installed longitudinally between the first and second auger shaft including means for mounting litter blending protrusions and apertures including at least tines for mixing the litter.

13. The method of claim 10, wherein the tracks are located between the center and front of the housing and the litter is processed by a tilling plate positioned between the tracks and the first auger shaft, the tilling plate including an angled sharp edge extending towards the tracks having teeth and slots allowing litter to pass between the teeth, and a leveling plate is positioned at the rear of the housing, supporting the vehicle.

14. The method of claim 10, wherein one or more of the sensors are moisture, PH, temperature and ammonia sensors located near the front of the housing making contact with the litter sending second data to one or both of the processor and server.

15. The litter processing system of claim 14 wherein one or more of the sensors are also located at the rear of the housing after the second auger shaft, making contact with the litter and sending third data to the processor.

16. The method of claim 10, wherein the housing includes means for storing dry and liquid litter treatment agents above the mixing auger shaft, means for dispensing the dry and liquid agents, the software determining types of treatment and type of agents dispensed based upon the second data.

17. The method of claim 16, wherein the agents include any one of liquids and solids comprising at least specific enzymes, drying agents, moisturizing agents, ammonia neutralizing agents, pesticides, insecticides and PH adjustment agents.

* * * * *